United States Patent [19]

Takeda

[11] 4,356,391

[45] Oct. 26, 1982

[54] MAGNETIC CARDS AND METHOD OF MANUFACTURING THE SAME

[76] Inventor: Shigekazu Takeda, 21-10, Nishiminemachi, Ohta-Ku, Tokyo, Japan

[21] Appl. No.: 220,085

[22] Filed: Dec. 24, 1980

[30] Foreign Application Priority Data

Dec. 28, 1979 [JP] Japan .............................. 54-181360[U]
Dec. 28, 1979 [JP] Japan .............................. 54-181361[U]
May 2, 1980 [JP] Japan .................................. 55-57911

[51] Int. Cl.³ ............................................ G06K 19/02
[52] U.S. Cl. ...................................... 235/493; 235/488
[58] Field of Search .............................. 235/488, 493; 156/244.11, 244.18, 244.19

[56] References Cited

U.S. PATENT DOCUMENTS 3,526,567 4/1967 Macone .................................. 161/47
3,711,355 4/1970 Staats et al. ......................... 156/499
4,044,231 8/1977 Beck ...................................... 235/488
4,058,839 11/1977 Darjany ............................... 235/488
4,297,570 10/1981 Kowalski ............................ 235/493

FOREIGN PATENT DOCUMENTS 1388862 3/1975 United Kingdom .

Primary Examiner—Harold I. Pitts
Attorney, Agent, or Firm—Wenderoth, Lind & Ponack

[57] ABSTRACT

The magnetic card comprises upper and lower resinous pack films, a sheet printed with necessary items and sealed in the upper and lower resinous pack films. A magnetic band recorded with information is interposed between the sheet and the upper pack film. A magnetic card sheet utilized to form the magnetic card is prepared by simultaneously passing first and second synthetic resin films through a T die while the films are still soft. The second synthetic resin film is incorporated with a powder of iron oxide and one half of the T die is provided with a plurality of spaced parallel grooves so that the second synthetic resin film is embedded in the first synthetic resin film at the grooves. Then a third synthetic resin film having lower melting point than the first and second resin films is bonded to the first synthetic resin film to cover the second synthetic resin film in the grooves.

8 Claims, 14 Drawing Figures

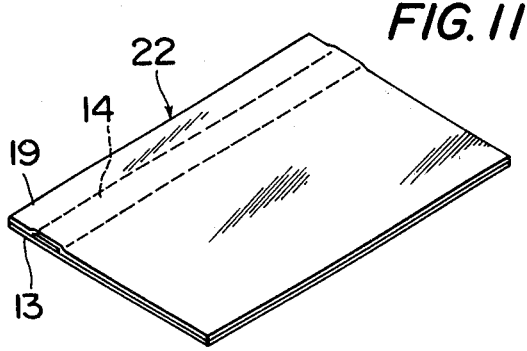
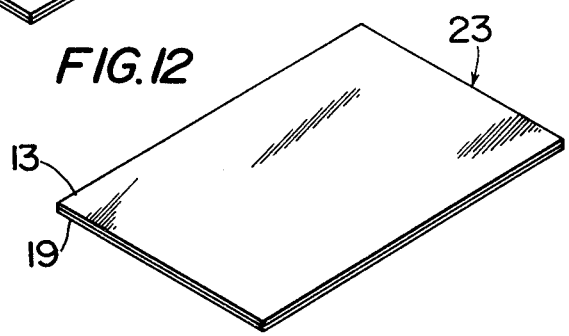
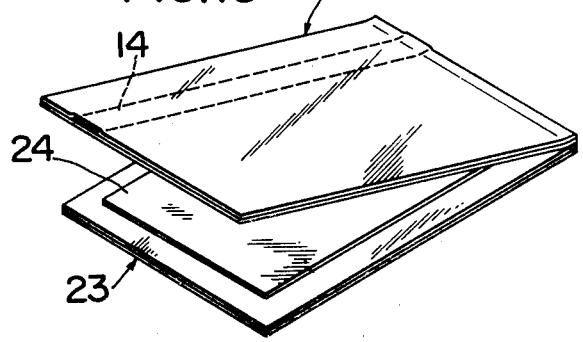
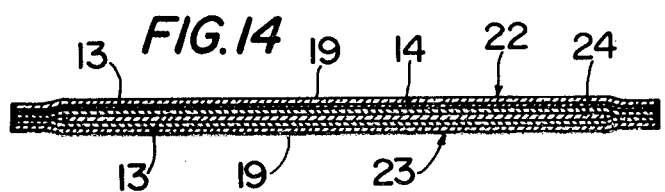

MAGNETIC CARDS AND METHOD OF MANUFACTURING THE SAME

BACKGROUND OF THE INVENTION

This invention relates to a magnetic card such as a cash card, a credit card or a season ticket.

In recent years, cards have been provided with bands printed with a magnetic material and information is recorded on the bands so that it may be reproduced. Usually, the printed band is formed on the front surface of the card so that it is liable to be damaged, thus making it difficult or impossible to accurately reproduce the recorded information.

SUMMARY OF THE INVENTION

It is an object of this invention to provide a novel magnetic card capable of obviating the defects described above.

Another object of this invention is to provide a method of manufacturing a magnetic card sheet capable of mass producing the magnetic card at a low cost.

According to one aspect of this invention there is provided a magnetic card comprising a sheet printed or written with necessary items, a transparent resinous upper pack film overlying the sheet, a resinous lower pack film underlying the sheet, the peripheral portions of the upper and lower pack films being bonded together to seal the sheet and a magnetic band recorded with information and interposed between the sheet and the upper pack film.

According to another aspect of this invention, there is provided a method of manufacturing a magnetic card sheet comprising the steps of extruding first and second synthetic resin films, the second synthetic resin film containing a powder of magnetizable material, simultaneously passing the first and second synthetic resin films through a T die while both films are soft or in a molten state, one half of the T die being provided with a plurality of spaced parallel grooves so as to embed the second synthetic resin film into the first synthetic resin film at the grooves and bonding a third synthetic resin film having higher melting point than the first and second synthetic resin films to cover stripes of the second synthetic resin film in the grooves to form the magnetic card sheet.

The magnetic card sheet is then cut between the grooves to obtain pieces each comprising the first synthetic resin film and a stripe of the second synthetic resin film embedded in a groove of the first synthetic resin sheet. The piece is utilized to form a magnetic card.

BRIEF DESCRIPTION OF THE DRAWINGS

In the accompanying drawings:

FIG. 11 is a perspective view showing a piece obtained by cutting a composite magnetic card sheet manufactured by the apparatus shown in FIG. 8;

FIG. 12 is a perspective view showing a lower pack film;

FIG. 13 is a perspective view showing a step of preparing a magnetic card; and

FIG. 14 is a sectional view showing a completed magnetic card.

DESCRIPTION OF THE PREFERRED EMBODIMENTS

Figure 1:
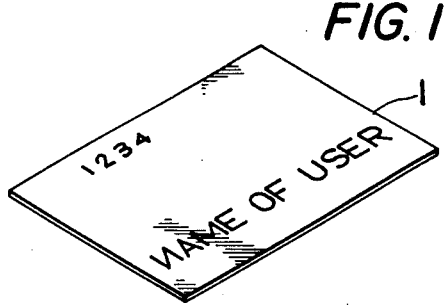
FIG. 1 is a perspective view of a paper sheet utilized in the magnetic card according to this invention.
Figure 2:
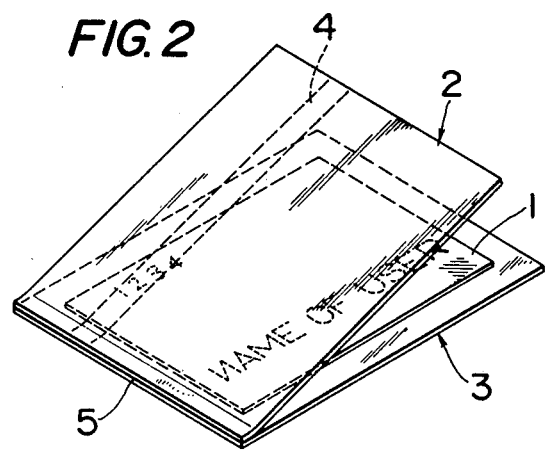
FIG. 2 is a perspective view showing the paper sheet interposed between pack films.
Figure 3:
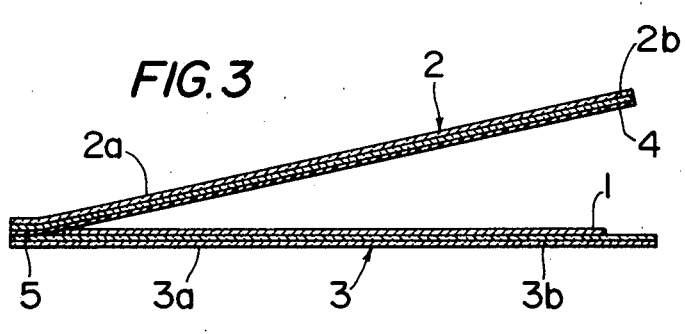
FIG. 3 is a side view of the assembly shown in FIG. 2.
Figure 4:
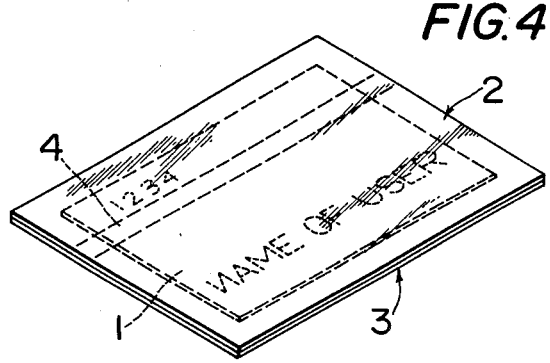
FIG. 4 is a perspective view showing one embodiment of a magnetic card embodying the invention.
Figure 5:
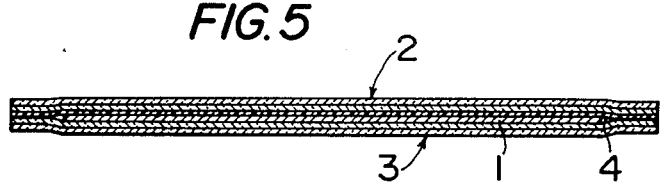
FIG. 5 shows a sectional view of the magnetic card shown in FIG. 4.

A paper sheet 1 is printed with necessary items by using a magnetic substance and written with the user's name, card number, etc. as shown in FIG. 1. This paper sheet is interposed between transparent upper and lower pack films 2 and 3 as shown in FIG. 2. As shown in FIG. 3, pack films 2 and 3 comprise polyester films 2a and 3a and polyethylene films 2b and 3b bonded to their inner surfaces. On the inner surface of the upper pack film 2 is provided with a longitudinal band 4 formed by printing magnetic material and containing necessary information. The shorter side edges of the upper and lower pack films 2 and 3 are bonded together at sealing point 5 as by welding. The pack films 2 and 3 have similar configuration to that of the paper sheet 1 but a little larger than it so that the periphery of the paper sheet 1 is bounded by the peripheral portions of the pack films 2 and 3. As shown in FIGS. 4 and 5, after laminating the paper sheet and the pack films 2 and 3, the peripheral portions are heat pressed to completely seal the paper sheet within the welded or bonded pack films, thus completing a magnetic card.

Figure 6:
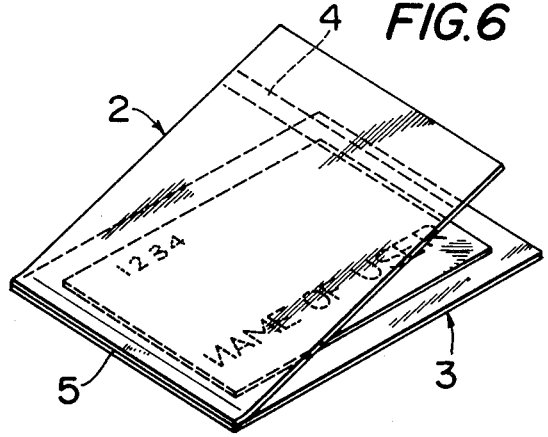
FIG. 6 is a perspective view showing the pack films and a paper sheet interposed therebetween.
Figure 7:
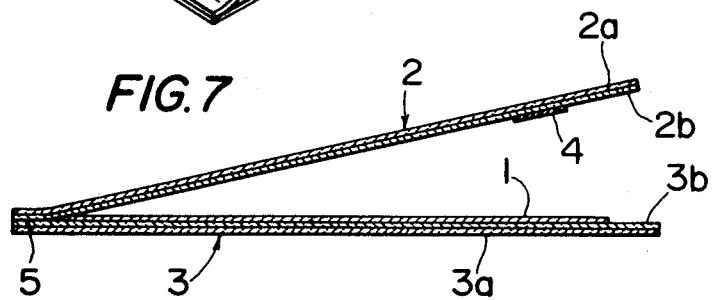
FIG. 7 is a perspective view showing still another embodiment of this invention.

The paper sheet 1 may be formed with either one of the printed and written information, or a user's photograph may be bonded on the front side. The magnet band 4 may be formed in the lateral direction as shown in FIG. 6 or may be formed between the polyester film 2a and the polyethylene film 2b as shown in FIG. 7. Furthermore, both films may be made of any transparent material but the inner side should be made of material that can be bonded by applying heat. A suitable length of a magnetic tape utilized in tape recorder may be used instead of the printed band, in which case a length of the magnetic tape is positioned at a desired position and then sealed.

The magnetic band may be formed by applying onto a synthetic resin film a paint containing a powder of an iron oxide. However, the magnetic card having a construction described above not only requires a number of manufacturing steps but also bonding between the magnetic band and the upper pack film or paper sheet is not always satisfactory.

Another aspect of this invention lies in the provision of an improved method of mass producing a sheet for use as magnetic recording card.

Figure 8:
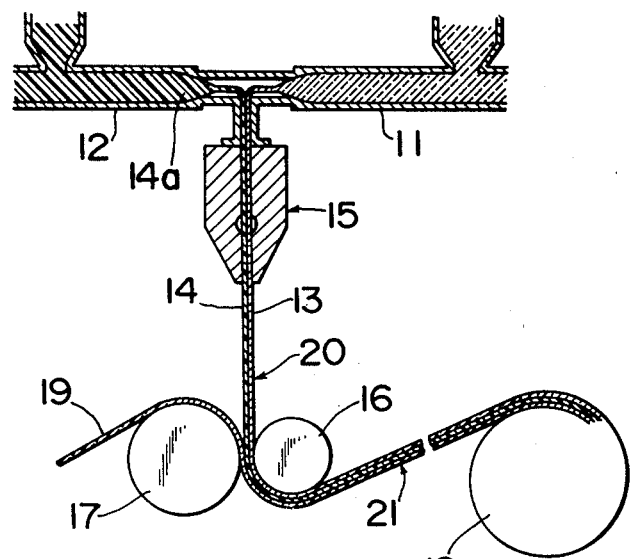
FIG. 8 is a diagrammatic representation showing apparatus for manufacturing a magnetic record sheet according to the method of this invention.
Figure 9:
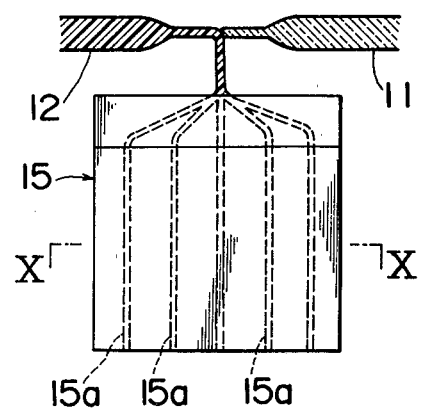
FIG. 9 is a side view of a T die utilized in the apparatus shown in FIG. 8.

Referring now to FIGS. 8 and 9, apparatus utilized to work out the method of this invention comprises first and second extruders 11 and 12 for extruding first and second synthetic resin films 14 and 15, a T die 15, a cooling roller 16, and a press roller 17 coated with silicone rubber or the like.

Figure 10:
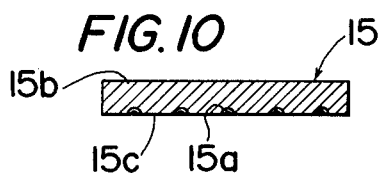
FIG. 10 is a sectional view of one mold half of the T die shown in FIG. 9.

The first synthetic resin film 13 extruded from the first extruder 11 comprises a relatively low melting point resin such as polyethylene or copolymer thereof, while the second synthetic resin film 14 extruded from the second extruder 12 is uniformly admixed with a powder 14a of an iron oxide. Then, the first and second synthetic resin films 13 and 14 are simultaneously passed through the T die 15. As shown in FIGS. 9 and 10, one half of the T die is provided with a plurality of uniformly spaced apart parallel grooves 15a extending in the direction of flow of the synthetic resin films. The grooves are formed on the inner surface 15c of one half 15b of the T die which engages the synthetic resin film 14 extruded by the second extruder 12. Accordingly, stripes of the second synthetic resin film 14 containing the powder 14a of iron oxide and still maintained at soft or molten state are embedded in one surface of the first synthetic resin film 13 also in the molten state so that the first and second synthetic resin films 13 and 14 extruded from the T die 15 are heat bonded into an integral resin sheet. Since the grooves 15a extend over the entire length of the mold half 15b there is no fear of diffusion of the second resin film into the first resin film. Thus, the stripes of the second resin film have predetermined widths, thicknesses and positions. While a composite sheet 20 is still in the molten or soft state, a synthetic resin film 19 having higher melting point than the first and second synthetic films 13 and 14 is applied to one surface of the film embedded with the stripes of the second synthetic resin and bonded thereto by passing through the cooling roller 16 and the press roller 17. The resulting composite sheet 21 is taken up by a take up roller 18. The composite sheet 21 is then cut into upper sheet 22 as shown in FIG. 11. A lower sheet 23 having the same size as the upper sheet 22 and constituted by the synthetic resin films 13 and 19 is prepared as shown in FIG. 12. One shorter side edges of the upper and lower sheets 22 and 23 are bonded together and then a card sheet 24 printed or written with necessary items is interposed between the upper and lower sheets as shown in FIG. 13. The peripheral portions of the upper and lower sheets surrounding the card sheet 24 are heat bonded to obtain a sealed magnetic card as shown in FIG. 14.

Thus, according to this method it is possible to mass produce a magnetic recording card sheet at a low cost. Since stripes of the second synthetic resin film containing a powder of iron oxide or other magnetizable substance are embedded into the first synthetic resin film the stripes are positively secured to the first synthetic resin film thus preventing displacement or peeling off of the stripes.

Further, according to the magnetic card shown in FIGS. 4 and 14, the magnetic band recorded with important information is covered by transparent resin films and sealed therein, so that the magnetic card is durable and can reproduce the recorded information over a long period. The lower pack film may be opaque.

What is claimed is:

1. A magnetic card comprising:
   a sheet having printed or written matter thereon;
   a transparent resinous upper pack film having an inner surface facing said sheet, said upper pack film overlying said sheet;
   a magnetic band bonded to said inner surface of said upper pack film; and
   resinous lower pack film underlying said sheet;
   peripheral portions of said upper and lower pack films being bonded together to seal said sheet and said magnetic band between said upper and lower pack film.

2. The magnetic card according to claim 1 wherein said sheet is made of paper.

3. The magnetic card according to claim 1 wherein said magnetic band is printed on said sheet.

4. The magnetic card according to claim 1 wherein said magnetic band comprises a length of a magnetic tape of the kind utilized in a tape recorder.

5. The magnetic card according to claim 1 wherein said magnetic band comprises a mixture of a synthetic resin and a powder of a magnetizable substance, said mixture taking a form of a stripe embedded in an inner surface of the upper pack film.

6. A method of manufacturing a magnetic card sheet comprising the steps of extruding first and second synthetic resin films, the second synthetic resin film containing a powder of magnetizable material, simultaneously passing said first and second synthetic resin films through a T die while both films are soft or in molten state, one half of the T die being provided with a plurality of spaced parallel grooves so as to embed said second synthetic resin film into said first synthetic resin film at said grooves, and bonding a third synthetic resin film having higher melting point than said first and second synthetic resin films to cover stripes of said second synthetic resin film in said grooves to form said magnetic card sheet.

7. The method according to claim 6 which further comprises the step of cutting said magnetic card sheet into a plurality of pieces utilized to form magnetic cards.

8. The method according to claim 6 wherein said magnetizable material comprises an iron oxide.

* * * * *